(12) United States Patent
Lee et al.

(10) Patent No.: US 10,539,826 B2
(45) Date of Patent: Jan. 21, 2020

(54) DISPLAY DEVICE HAVING A COLOR CONVERSION LAYER

(71) Applicant: Samsung Display Co., LTD., Yongin, Gyeonggi-Do (KR)

(72) Inventors: Kwang Keun Lee, Osan-si (KR); Jung Hyun Kwon, Seoul (KR); Seon Tae Yoon, Seoul (KR); Hae Il Park, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 38 days.

(21) Appl. No.: 14/691,698

(22) Filed: Apr. 21, 2015

(65) Prior Publication Data
US 2016/0041430 A1   Feb. 11, 2016

(30) Foreign Application Priority Data

Aug. 5, 2014  (KR) .................. 10-2014-0100602

(51) Int. Cl.
*G02F 1/1335* (2006.01)

(52) U.S. Cl.
CPC .. *G02F 1/133617* (2013.01); *G02F 1/133514* (2013.01); *G02F 2001/133614* (2013.01)

(58) Field of Classification Search
CPC combination set(s) only.
See application file for complete search history.

(56) References Cited

U.S. PATENT DOCUMENTS

| | | | |
|---|---|---|---|
| 2007/0200492 A1* | 8/2007 | Cok | H01L 27/322 313/506 |
| 2007/0228927 A1* | 10/2007 | Kindler | G03B 21/56 313/495 |
| 2008/0055515 A1 | 3/2008 | Ha et al. | |
| 2010/0265692 A1 | 10/2010 | Willemsen et al. | |
| 2011/0069369 A1* | 3/2011 | Park | G02B 26/002 359/230 |

(Continued)

FOREIGN PATENT DOCUMENTS

| KR | 10-2012-0097774 A | 9/2012 |
|---|---|---|
| KR | 10-2013-0000506 A | 1/2013 |

(Continued)

OTHER PUBLICATIONS

Kim Goung-Soo, the world's lightest solids "Aerogel", Aerogel, Science & Technology File, Jul. 2006, p. 37, Magazine, Korea Institute of Industrial Technology,Korea.

(Continued)

*Primary Examiner* — Lauren Nguyen
(74) *Attorney, Agent, or Firm* — H.C. Park & Associates, PLC

(57) ABSTRACT

A display device includes: a first substrate; a second substrate facing the first substrate; a light-amount adjusting layer interposed between the first substrate and the second substrate; and a backlight unit disposed under the first substrate, wherein the second substrate includes a plurality of color conversion layers respectively disposed on a plurality of pixel regions, the color conversion layer includes a partition wall; and a phosphor disposed on areas defined by the partition wall, and the color conversion layer includes an air layer between the second substrate and the phosphor.

12 Claims, 10 Drawing Sheets

(56) References Cited

U.S. PATENT DOCUMENTS

2011/0222155 A1* 9/2011 Sakai ............... G02B 5/3083
359/489.07
2014/0043566 A1 2/2014 Lee et al.

FOREIGN PATENT DOCUMENTS

KR 2011-0061030 * 3/2013 ........... G02F 1/1335
KR 10-2014-0021258 A 2/2014

OTHER PUBLICATIONS

Swie Lan Njo, et al. "Light-Efficient Liquid Crystal Displays Using Photoluminescent Color Filters", SID Symposium Digest of Technical Papers, vol. 31, Issue 1, 23.3,pp. 343-345, May 2000, Book, USA.

Hee-Sun Yang and Se-Young Choi, "Synthesis of Silica Aerogel and Thin Film Coating at Ambient Pressure (I)", Journal of the Korean Ceramic Society, vol. 34, No. 2, pp. 188-194, 1997, Print, Korea.

Jyoti L. Gurav, et al., "Silica Aerogel: Synthesis and Applications", Hindawi Publishing Corporation Journal of Nanomaterials, vol. 2010, Article ID 409310, 11 pages doi;10.1155/2010/409310, Print, USA.

Jeong Rok Oh et al., "Highly efficient full-color display based on blue LED backlight and electrothermic light-valve coupled with front-emitting phosphors", Optics Express 16022, Aug. 15, 2011, vol. 19, No. 17., Print, USA.

G.J.Heo, et al. "Color PH-LCD Using STN Mode", Proceeding of the International Display Workshops, Institute of Image Information and Television Engineers, pp. 221-226, 1998, Print, Japan.

* cited by examiner

DISPLAY DEVICE HAVING A COLOR CONVERSION LAYER

CLAIM OF PRIORITY

This application claims the priority to and all the benefits accruing under 35 U.S.C. § 119 of Korean Patent Application No. 10-2014-0100602, filed on Aug. 5, 2014, with the Korean Intellectual Property Office ("KIPO"), the disclosure of which is incorporated herein in its entirety by reference.

BACKGROUND OF THE INVENTION

1. Field of the Invention

The present disclosure of invention relates to a display device that includes a color conversion layer including an air layer configured to improve light extraction efficiency.

2. Description of the Related Art

A liquid crystal display (LCD) is a type of flat panel displays (FPDs), which is the most widely used these days. The LCD includes two substrates including electrodes formed thereon and a liquid crystal layer interposed therebetween. Upon applying voltage to the electrodes, liquid crystal molecules of the liquid crystal layer are rearranged, thereby adjusting the amount of transmitted light.

The LCD device may express colors using a color conversion layer including a phosphor instead of a color filter. In a case where the color conversion layer including the phosphor is used in an upper substrate, the LCD device may have an improved viewing angle and excellent color reproduction, but light extraction efficiency may deteriorate.

Light converted inside the color conversion layer may be trapped in a resin and the like inside the color conversion layer or may not escape from the upper substrate due to total internal reflection that occurs at a boundary between the external air and the upper substrate, which results in a decrease in the light extraction efficiency.

Therefore, a structure for improving the light extraction efficiency of the display device including the color conversion layer is required.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY OF THE INVENTION

The present disclosure of invention is directed to a display device that includes a color conversion layer including an air layer.

According to an embodiment of the present invention, a display device may include a first substrate; a second substrate facing the first substrate; a light-amount adjusting layer interposed between the first substrate and the second substrate; and a backlight unit disposed under the first substrate, wherein the second substrate includes a plurality of color conversion layers respectively disposed on a plurality of pixel regions, the color conversion layer includes a partition wall; and a phosphor disposed on areas defined by the partition wall, and the color conversion layer includes an air layer between the second substrate and the phosphor.

The color conversion layer may be disposed on a bottom surface of the second substrate.

The partition wall may include a reflective surface configured to reflect light toward the outside.

The color conversion layer may further include a pattern disposed on the air layer.

The display device may further include a reflection filter disposed under the color conversion layer.

The display device may further include a sub-partition wall configured to partition the area defined by the partition wall into two or more areas.

The phosphor may include a scattering particle.

The phosphor may include at least one of a red phosphor, a green phosphor, and a blue phosphor.

The phosphor may include a quantum dot particle.

The display device may further include a polarizer disposed on the second substrate.

The display device may further include a polarizer disposed on the first substrate.

According to an embodiment of the present invention, a display device may include: a first substrate; a second substrate facing the first substrate; a light-amount adjusting layer interposed between the first substrate and the second substrate; a third substrate facing the second substrate; and a backlight unit disposed under the first substrate, wherein the third substrate includes a plurality of color conversion layers respectively disposed on a plurality of pixel regions, the color conversion layer includes a partition wall; and a phosphor disposed on areas defined by the partition wall, and the color conversion layer includes an air layer between the third substrate and the phosphor.

The color conversion layer may be disposed on a bottom surface of the third substrate.

The color conversion layer may further include a pattern disposed on the air layer.

The display device may further include a reflection filter disposed under the color conversion layer.

The display device may further include a sub-partition wall configured to partition the area defined by the partition wall into two or more areas.

The partition wall may include a reflective surface configured to reflect light toward the outside.

The phosphor may include a scattering particle.

According to an embodiment of the present invention, a display device may include: a first substrate; a second substrate facing the first substrate; a light-amount adjusting layer interposed between the first substrate and the second substrate; and a backlight unit disposed under the first substrate, wherein the second substrate includes a plurality of color conversion layers respectively disposed on a plurality of pixel regions, the color conversion layer includes a partition wall; and a phosphor disposed on areas defined by the partition wall, and the color conversion layer includes a low-refractive index layer between the second substrate and the phosphor.

The low-refractive index layer may include aerogel.

According to embodiments of the present invention, a display device is designed to reduce light reflected off a boundary between the external air and an upper substrate and trapped inside the upper substrate, thereby improving the external light extraction efficiency.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and aspects of the present disclosure of invention will be more clearly understood from the following detailed description taken in conjunction with the accompanying drawings, in which.

DETAILED DESCRIPTION OF THE INVENTION

Figure 1:
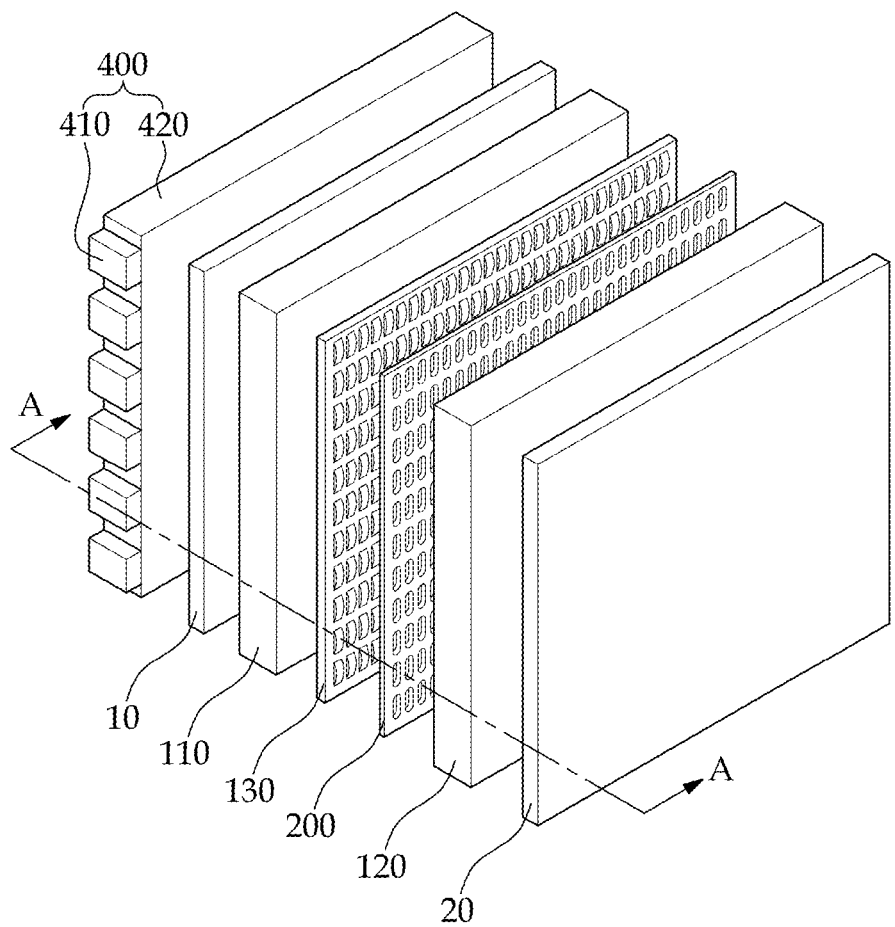
FIG. 1 is an exploded perspective view illustrating a display device according to a first embodiment of the present invention.

Advantages and features of the present invention and methods for achieving them will be made clear from embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is merely defined by the scope of the claims. Therefore, well-known constituent elements, operations and techniques are not described in detail in the embodiments in order to prevent the present invention from being obscurely interpreted. Like reference numerals refer to like elements throughout the specification.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Hereinafter, a display device according to a first embodiment of the present invention will be described with reference to FIGS. 1 to 3.

Figure 4:
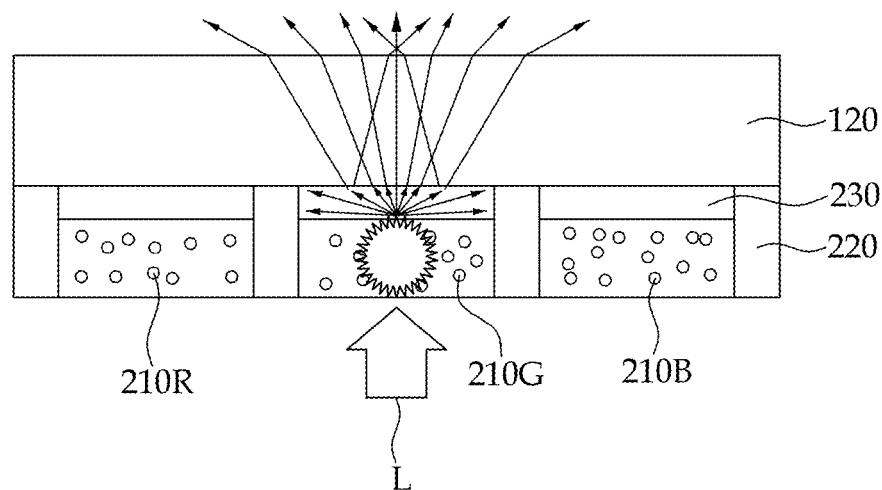
FIG. 4 is a cross-sectional view illustrating that light passing through an air layer is extracted to the outside.
Figure 5:
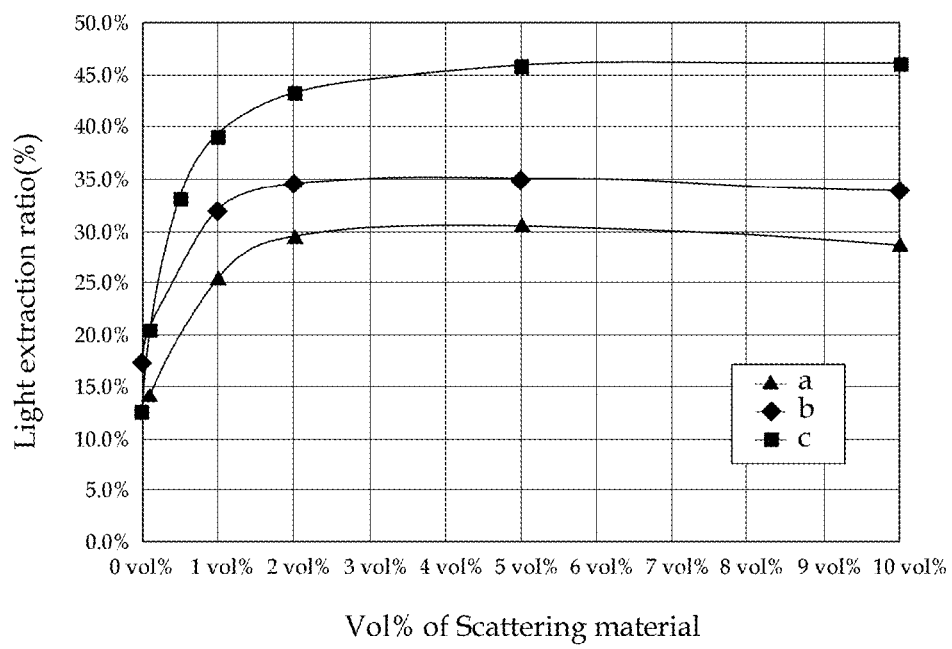
FIG. 5 is a graph illustrating light extraction efficiency when the air layer is applied.

FIG. 1 is an exploded perspective view illustrating a display device according to a first embodiment of the present invention. FIG. 2 is a schematic cross-sectional view along A-A illustrating the display device of FIG. 1. FIG. 3 is a cross-sectional view illustrating one pixel of the display device of FIG. 2. FIG. 4 is a cross-sectional view illustrating that light passing through an air layer is extracted to the outside. FIG. 5 is a graph illustrating light extraction efficiency when the air layer is applied.

Figure 2:
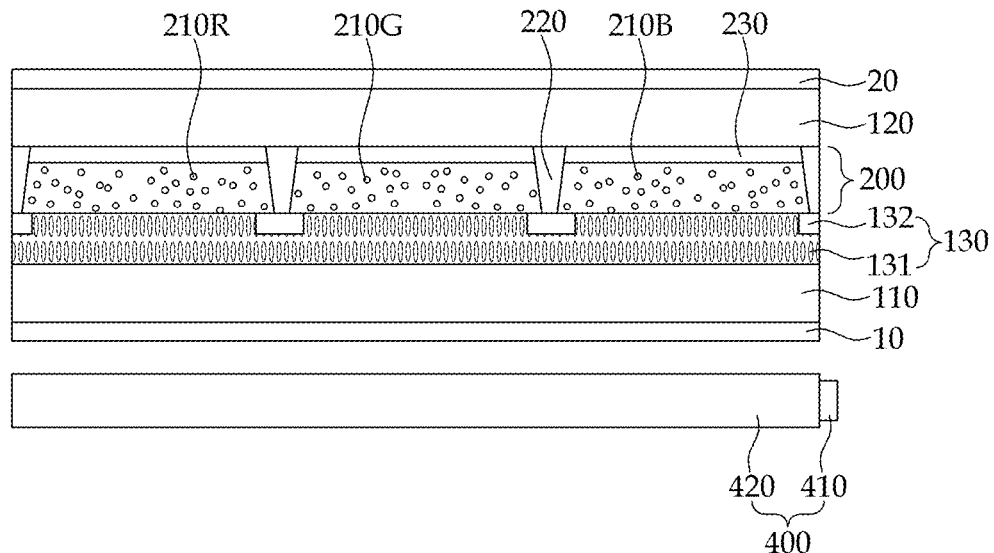
FIG. 2 is a schematic cross-sectional view illustrating the display device of FIG. 1.
Figure 3:
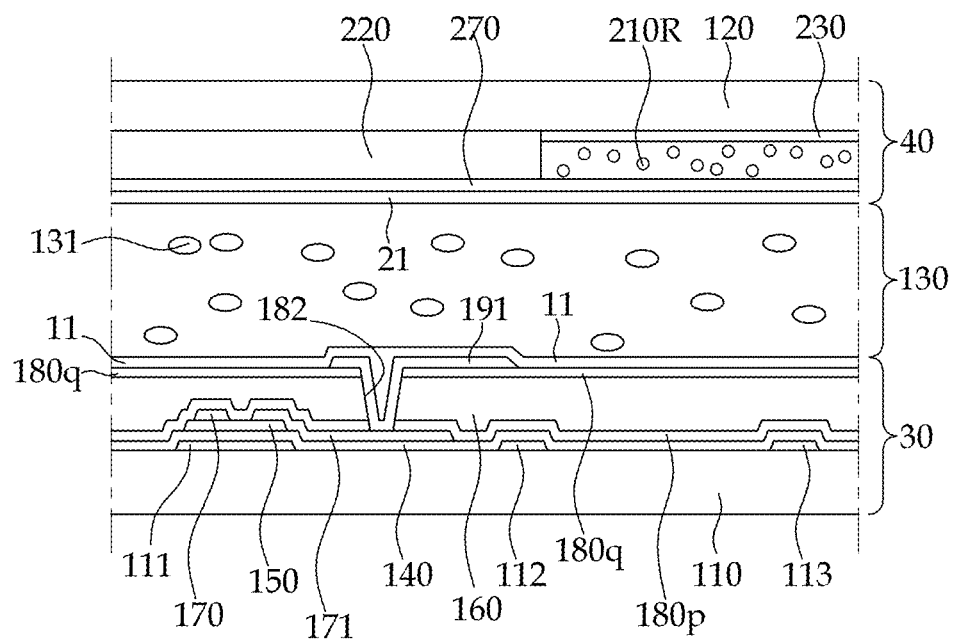
FIG. 3 is a cross-sectional view illustrating one pixel of the display device of FIG. 2.

Referring to FIGS. 1 to 3, the display device includes a first substrate 110, a light-amount adjusting layer 130 disposed on the first substrate 110, a second substrate 120 disposed on the light-amount adjusting layer 130 and facing the first substrate 110, a backlight unit 400 disposed under the first substrate 110, a first polarizer 10 disposed under the first substrate 110, and a second polarizer 20 disposed on the second substrate 120.

The second substrate 120 includes a plurality of color conversion layers 200 respectively disposed on a plurality of pixel regions.

The first and second substrates 110 and 120 are formed of a transparent material such as glass or plastic.

The light-amount adjusting layer 130 and the plurality of color conversion layers 200 are disposed between the first substrate 110 and the second substrate 120. The color conversion layer 200 is disposed on the light-amount adjusting layer 130.

The display device includes a plurality of pixels corresponding to a perpendicular direction of the first substrate 110, the second substrate 120, the light-amount adjusting layer 130, and the plurality of color conversion layers 200. The plurality of pixels may be disposed in a matrix form on a plane.

The backlight unit 400 is disposed under the first substrate 110. The backlight unit 400 includes a light source 410 and a light guide plate 420. The backlight unit 400 may radiate ultraviolet light rays, near-ultraviolet light rays, or blue light rays.

The first polarizer 10 and the second polarizer 20 are respectively disposed on the first and second substrates 110 and 120 on each opposite side from facing surfaces of the first and second substrates 110 and 120. That is, the first polarizer 10 may be attached on an outer side of the first substrate 110 and the second polarizer 20 may be attached on an outer side of the second substrate 120. A transmissive axis of the first polarizer 10 may be substantially at right angles to a transmissive axis of the second polarizer 20.

The light-amount adjusting layer 130 may include a plurality of liquid crystal molecules 31. The light-amount adjusting layer 130 may further include a light blocking member 132 that defines boundaries of the plurality of pixels.

The plurality of color conversion layers 200 include a plurality of partition walls 220 defining a plurality of pixel regions and a plurality of phosphors 210R, 210G, and 210B disposed in the plurality of pixel regions defined by the partition walls 220.

The plurality of color conversion layers 200 may include a first color pixel, a second color pixel, a third color pixel, and the like. For example, the first color pixel may be a red pixel, the second color pixel may be a green pixel, and the third pixel may be a blue pixel. The red color pixel includes the red phosphor 210R, the green pixel includes the green phosphor 210G, and the blue pixel includes the blue phosphor 210B.

Light leaving the red pixel of the color conversion layer 200 exhibits a red color, light leaving the green pixel exhibits a green color, and light leaving the blue pixel exhibits a blue color.

The color conversion layer 200 may be formed of resins including the phosphors 210R, 210G, and 210B. The phosphor is a substance emitting fluorescence when irradiated with light, radiation, and the like. Each of the phosphors emits light of a unique color regardless of a color of the radiated light. Further, the phosphor emits the light toward the whole area, regardless of a direction of incident light.

Although not illustrated, the color conversion layer 200 may include a phosphor having another color besides the above-described colors and the phosphor may scatter light having a fourth color.

The phosphors 210R, 210G, and 210B of the color conversion layer 200 may include quantum dot particles.

The quantum dot particles are wavelength conversion particles that may adjust the wavelength of light so as to emit specific desired light. Quantum dots having different particle sizes may convert different wavelengths. Therefore, light of a desired color can be emitted by adjusting a diameter of the quantum dot.

The quantum dot particle may have a 100 to 1000 times larger extinction coefficient and a high quantum yield compared to general fluorescent dyes, thereby producing very strong fluorescence.

Particularly, the quantum dot particles may shift and convert provided light having a short wavelength into light having a longer wavelength.

The quantum dot particle may include a core nanocrystal and a shell nanocrystal surrounding the core nanocrystal. Further, the quantum dot particle may include an organic ligand bonded to the shell nanocrystal. Further, the quantum dot particle may further include an organic coating layer surrounding the shell nanocrystal.

The shell nanocrytal may have two or more layers. The shell nanocrystal is formed on a surface of the core nanocrystal. The quantum dot particle may convert wavelength of light incident on the core nanocrystal into a longer wavelength and improve light efficiency by using the shell nanocrystal forming a shell layer.

The quantum dot particle may include at least one substance of group II compound semiconductors, group III compound semiconductors, group V compound semiconductors, and group VI compound semiconductors. In more detail, the core nanocrystal may include PbSe, InAs, PbS, CdSe, InGaP, CdTe, CdS, ZnSe, ZnTe, ZnS, HgTe or HgS. Further, the shell nanocrystals may include CuZnS, CdSe, CdTe, CdS, ZnSe, ZnTe, ZnS, HgTe or HgS.

For example, in a case where the core nanocrystal includes CdSe and a diameter of the quantum dot particle is 1 nm to 3 nm, blue light may be emitted. Further, in a case where the diameter of the quantum dot particle is 3 nm to 5 nm, green light may be emitted, and in a case where the diameter of the quantum dot particle is 7 nm to 10 nm, red light may be emitted.

The wavelength of the light emitted from the quantum dot particles may be adjusted depending on a size of the quantum dot particle or a molar ratio of a molecular cluster compound and a nano-sized precursor in a compounding process. The organic ligand may include pyridine, mercapto alcohol, thiol, phopshinc, and phosphine oxide, and the like. The organic ligand plays a role in stabilizing the quantum dot particle that becomes unstabilized after synthesized. That is, after the quantum dot particle is synthesized, a dangling bond is formed outside, which may make the quantum dot particle unstabilized. However, one end of the organic ligand is nonbonding and the one end of the nonbonding organic ligand may be bonded to the dangling bond, thereby stabilizing the quantum dot particle.

The quantum dot particle may be synthesized by a wet-chemical method. Herein, the wet-chemical method refers to a method where a precursor material is put into an organic solvent to grow as a particle. By this wet-chemical method, the quantum dot particle can be synthesized.

Total internal reflection occurs at a boundary between the external air and the second substrate 120 of the conventional display device, such that approximately 10% of the whole light is extracted to the outside. That is, light subject to the total internal reflection is trapped inside the second substrate 120 and is not able to escape to the outside, which results in a decrease in light extraction efficiency.

Therefore, in order to improve the light extraction efficiency of the display device, the plurality of color conversion layers 200 include an air layer 230 between the second substrate 120 and the phosphor, the partition wall 220 disposed on the plurality of color conversion layers 200 includes a light reflective surface on the outside, and the plurality of color conversion layers 200 include quantum dot particles or scattering particles as illustrated above. The scattering particles may be formed of titanium oxide (TiO2).

With reference to FIG. 4, the reason why the light extraction efficiency is improved as the color conversion layer 200 includes the air layer 200, the partition wall 220 having a light-reflecting function and scattering particles is as follow.

As illustrated in FIG. 4, light is scattered in many different directions and recycled inside the air layer 230 by the scattering particles and the partition wall 220 having the light-reflecting function. As the light is scattered inside the air layer 230, an output amount of light incident on the second substrate 120 is increased, thereby improving the light extraction efficiency.

Further, as illustrated in FIG. 4, the air layer 230 is configured to collect light toward a boundary surface between the external air and the second substrate 120. That is, as illustrated in FIG. 4, straightness of light collected by the air layer 230 is enhanced and the light passing through the air layer 230 is less likely to be subject to the total internal reflection at the boundary surface between the external air and the second substrate 120 compared to a light behavior in the display device without the air layer 230.

The reason why the light passing through the air layer 230 has a lower chance of being subject to the total internal reflection is because an incident angle of light incident on the boundary surface between the external air and the second substrate 120 is reduced and the total internal reflection is less likely to occur in accordance with a decrease in the light incident angle, according to Snell's law.

Accordingly, the light extraction efficiency is improved as the color conversion layer 200 includes the partition wall having the light-reflecting function, the phosphor including the scattering particle, and the air layer. That is because an amount of light incident on the second substrate 120 is increased and light undergoing the total internal reflection at the boundary surface between the second substrate 120 and the external air is reduced, in accordance with an increase in an amount of light scattering inside the air layer.

FIG. 5 illustrates that the light extraction efficiency is increased as the air layer 230 is used in the color conversion layer 200. In a graph of FIG. 5, x-axis represents concentration of the scattering particles disposed inside the phosphor and y-axis represent the light extraction efficiency. Symbol "a" represents a case where the air layer is not used, symbol "b" b represents a case where air is partly injected inside the resin accommodating the phosphor, and symbol "c" c represents a case where the air layer 230 is applied. As illustrated in the graph, the case of applying the air layer 230 shows the highest light extraction efficiency on condition that the concentrations of the scattering particles are the same.

Hereinafter, one pixel of the display device will be described in detail with reference to FIG. 3.

The display device includes a lower display panel 30 and an upper display panel 40 disposed to face each other and the light-amount adjusting layer 130 disposed between the two display panels 30 and 40. In FIG. 3, a liquid crystal layer is used as the light-amount adjusting layer 130 according to an embodiment of the present invention.

Firstly, the lower display panel 30 will be described.

A gate line and a storage electrode line 112 are disposed in one direction on the first substrate 110. The first substrate 110 may be made of a transparent material, such as glasses and plastics.

The gate line generally extends in a width direction and supplies a gate signal. A gate electrode 111 protrudes from the gate line.

The storage electrode line 112 extends in the same direction as the gate line and a predetermined voltage is applied to the storage electrode line 112. The storage electrode 113 protrudes from the storage electrode line 112.

A gate insulating layer 140 is formed on the gate line, the storage electrode line 112, the gate electrode 111, and the storage electrode 113. The gate insulating layer 140 may be made of inorganic insulating materials, such as silicon nitride (SiNx) and silicon oxide (SiOx). Further, the gate insulating layer 140 may have a single-layer or a multi-layer structure.

A semiconductor layer 150 is formed on the gate insulating layer 140. The semiconductor layer 150 may be disposed on the gate electrode 111.

The semiconductor layer 150 may be made of amorphous silicon, polycrystalline silicon, metal oxide, and the like.

An ohmic contact member (not illustrated) may be further formed on the semiconductor layer 150.

A data line, a source electrode 170, and a drain electrode 171 are formed on the semiconductor layer 150 and the gate insulating layer 140.

The semiconductor layer 150 may be formed not only on the gate electrode 111 but also under the data line.

The data line generally extends in a length direction and intersects with the gate line. The data line supplies a data voltage.

The source electrode 170 is formed protruding from the data line toward the gate electrode 111. The source electrode 170 may be bent on the gate electrode 111 having a C-form.

The drain electrode 171 is spaced apart from the source electrode 170 on the gate electrode 111. A channel is formed on the semiconductor layer 150 in an exposed area between the source electrode 170 and the drain electrode 171 spaced apart from each other.

The gate electrode 111, the semiconductor layer 150, the source electrode 170, and the drain electrode 171 form a switching element.

A first protective film 180p is formed on the data line, the source electrode 170, the drain electrode 171, and the semiconductor layer 150 exposed between the source electrode 170 and the drain electrode 171. The first protective film 180p may be made of inorganic insulating materials, such as silicon nitride (SiNx) and silicon oxide (SiOx).

A planarizing layer 160 is disposed on the first protective film 180p. The planarizing layer 160 may be formed of at least one selected from a group of polyacrylate resins, epoxy resins, phenolic resins, polyamide resins, polyimide reins, unsaturated polyester resins, polyphenylenether resins, polyphenylenesulfide resins, and benzocyclobutene (BCB).

A second protective film 180q is further formed on the planarizing layer 160. The second protective film 180q may be made of inorganic insulating materials, such as silicon nitride (SiNx) and silicon oxide (SiOx). The second protective film 180q is configured to prevent the planarizing layer 160 from being loosened off and to prevent the liquid crystal layer 300 from being contaminated by organic materials infiltrating from the planarizing layer 160, thereby preventing defectives like image sticking caused in a screen operation.

A contact hole 182 is formed on the first protective film 180p, the planarizing layer 160, and the second protective film 180q so as to expose the drain electrode 171.

A first electrode 191 is formed on the first protective film 180p. The first electrode 191 is connected to the drain electrode 171 through the contact hole 182. The first electrode 191 receives the data voltage from the drain electrode 171.

The first electrode 191 supplied with the data voltage creates an electric field with a second electrode 270 of the upper display panel 40 described below, and thus a direction of liquid crystal molecules 131 of the liquid crystal layer 130 between the electrodes 191 and 270 is determined accordingly. Luminance of light passing through the liquid crystal layer 130 varies in accordance with such determined direction of the liquid crystal molecules 131.

The first electrode 191 and the second electrode 270 form a liquid crystal capacitor with the liquid crystal layer 130 interposed therebetween, and thus a supplied voltage is maintained even after a thin film transistor is turned off.

The first electrode 191 overlaps a storage electrode line 112 along with a storage electrode 113 to form a storage capacitor. The storage capacitor may enhance a voltage-storage capacity of the liquid crystal capacitor.

A first alignment layer 11 is formed on the first electrode 191. The first alignment layer 11 may be a vertical alignment layer or an alignment layer optically aligned using a photopolymer material.

Next, the upper display panel 40 will be described below.

The second electrode 270 is disposed on the second substrate 120. The second electrode 270 may be made of a transparent metal material, such as indium tin oxide (ITO), indium zinc oxide (IZO), and the like. A predetermined voltage may be applied to the second electrode 270 and an electric field may be formed between the first electrode 191 and the second electrode 270.

A second alignment layer 21 is formed on the second electrode 270. The second alignment layer 21 may be a vertical alignment layer or an alignment layer optically aligned using a photopolymer material.

Hereinafter, a method of manufacturing the display device will be described with reference to FIGS. 6A to 6D.

Figure 6A:
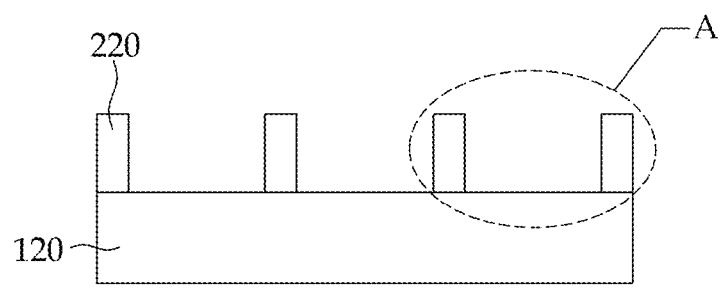
FIGS. 6A to 6D are cross-sectional views illustrating a method of manufacturing a color conversion layer including the air layer.
Figure 6B:
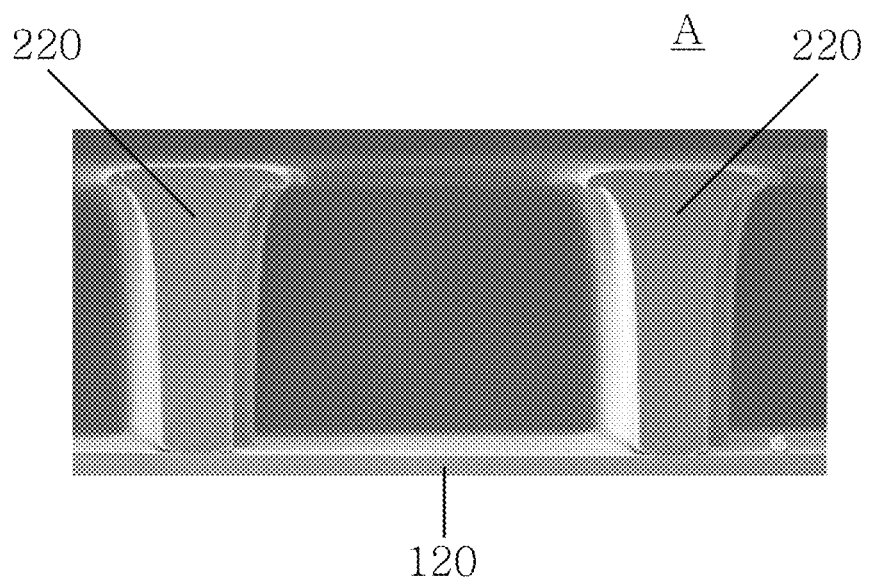

Referring to FIGS. 6A to 6D, the partition wall 220 is formed on the second substrate 120. FIG. 6B illustrates a physical partition wall 220 enlarged by a microscope.

Figure 6C:
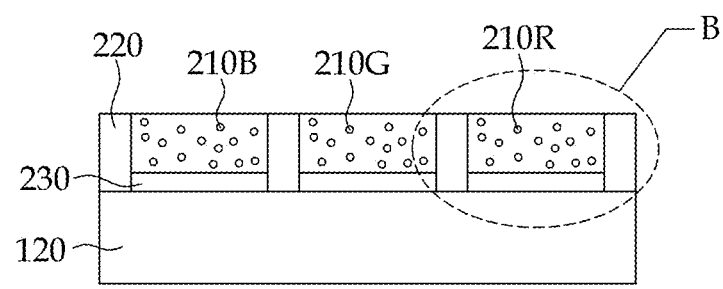
Figure 6D:
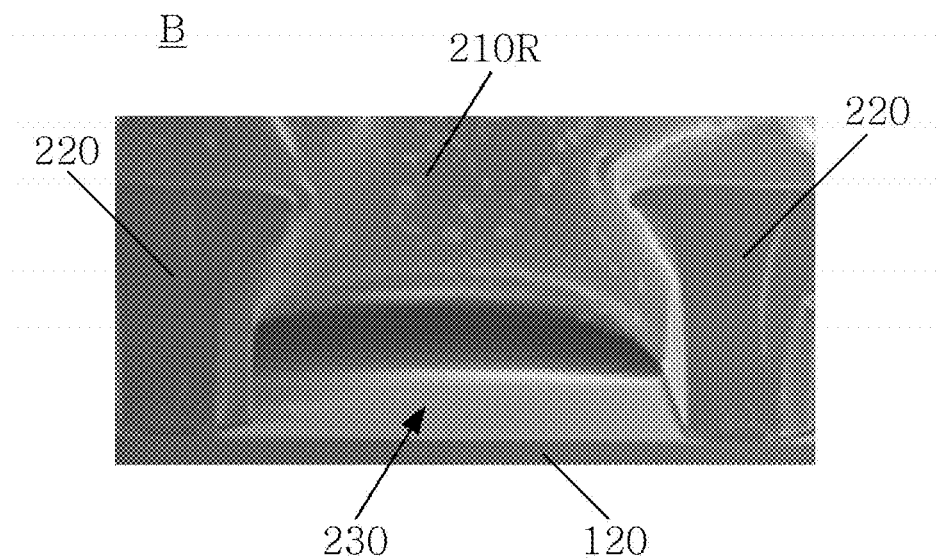
Figure 7A:
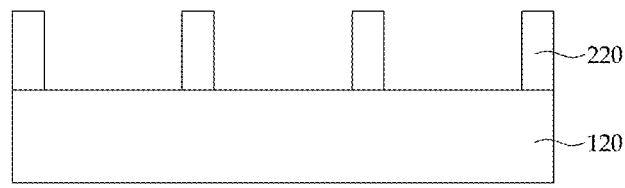
FIGS. 7A to 7D are cross-sectional views illustrating another method of manufacturing a color conversion layer including the air layer.
Figure 7B:
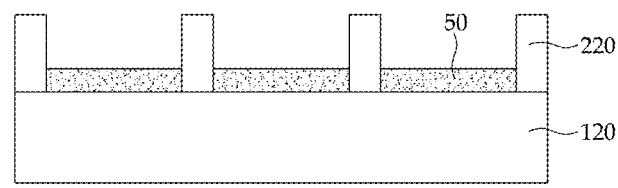
Figure 7C:
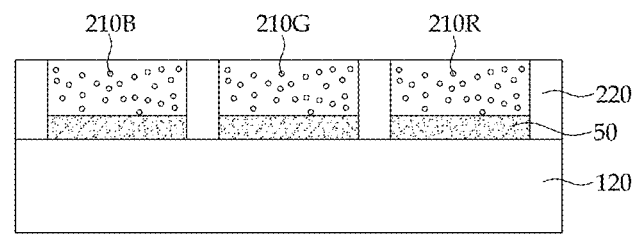
Figure 7D:
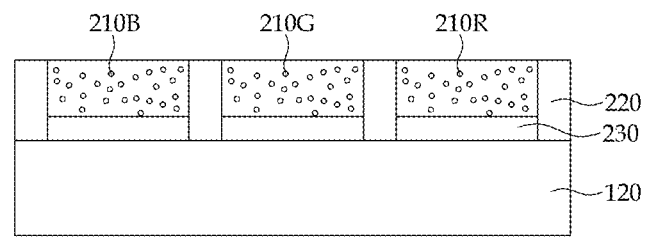

Referring to FIGS. 6C and 6D, wettabilities of the phosphors 210R, 210G, and 210B and the partition wall 220 or wettabilities of the phosphors 210R, 210G, and 210B and a surface of the second substrate 120 are adjusted to form the air layer 230. That is, in a case where the wettabilities of the phosphors 210R, 210G, and 210B and the partition wall 220 are different from each other or the wettabilities of the phosphors 210R, 210G, and 210B and the surface of the second substrate 120 are different from each other, the phosphors 210R, 210G, and 210B are not fully filled in a part of area between the surface of the second substrate 120 and the partition wall 220, thereby producing an air gap. The air gap becomes the air layer 230. When enlarged by the microscope, FIG. 6D shows that the air layer 230 is formed between the phosphors 210R, 210G, and 210B and the second substrate 120.

Meanwhile, surface energy of the partition wall 220 is increased so as to allow the wettabilities of the phosphors 210R, 210G, and 210B and the partition wall 220 to be different from each other. That is, a difference in the wettabilities of the phosphors 210R, 210G, and 210B and the partition wall 220 or the phosphors 210R, 210G, and 210B and the surface of the second substrate 120 becomes large in accordance with an increase in the surface energy difference thereof.

Hereinafter, another method of manufacturing the display device according to an embodiment of the present invention will be described with reference to FIGS. 7A to 7D.

Referring to FIGS. 7A to 7D, the partition wall 220 is formed on the second substrate 120. A sacrificial layer 50 is formed on an area defined by the partition wall 220. The sacrificial layer 50 may be formed of a photo-resist material. The phosphors 210R, 210G, and 210B are formed on the sacrificial layer 50. When the phosphors 210R, 210G, and 210B are formed, the sacrificial layer 50 is partly exposed. An etchant is injected to the sacrificial layer 50 through the exposed area to remove the sacrificial layer 50. The air layer 230 is formed as the sacrificial layer 50 is removed. Meanwhile, in some embodiments, the sacrificial layer 50 may be formed of a material that vaporizes at a predetermined temperature and be removed.

Hereinafter, second to fifth embodiments of the present invention will be described with reference to FIGS. 8 to 11.

Figure 8:
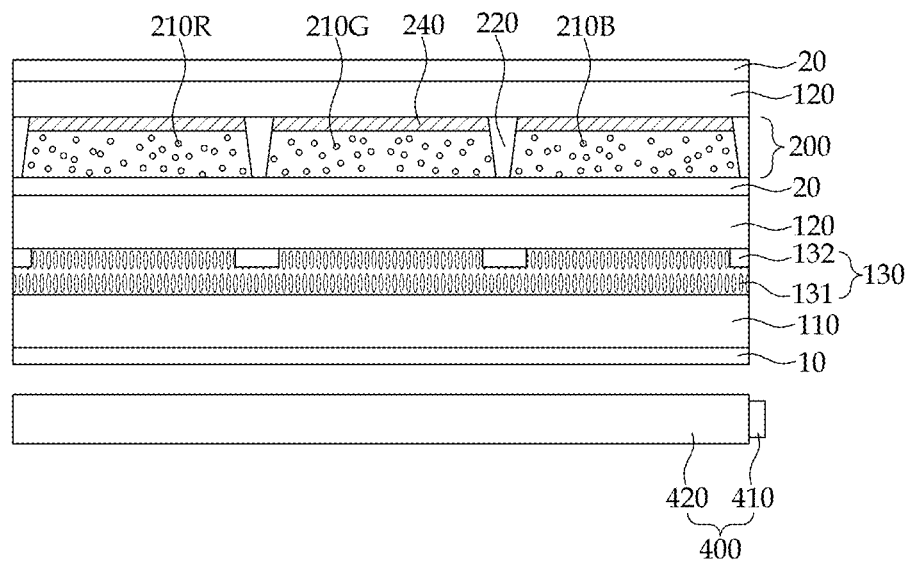
FIG. 8 is a cross-sectional view illustrating a display device according to a second embodiment of the present invention.
Figure 9:
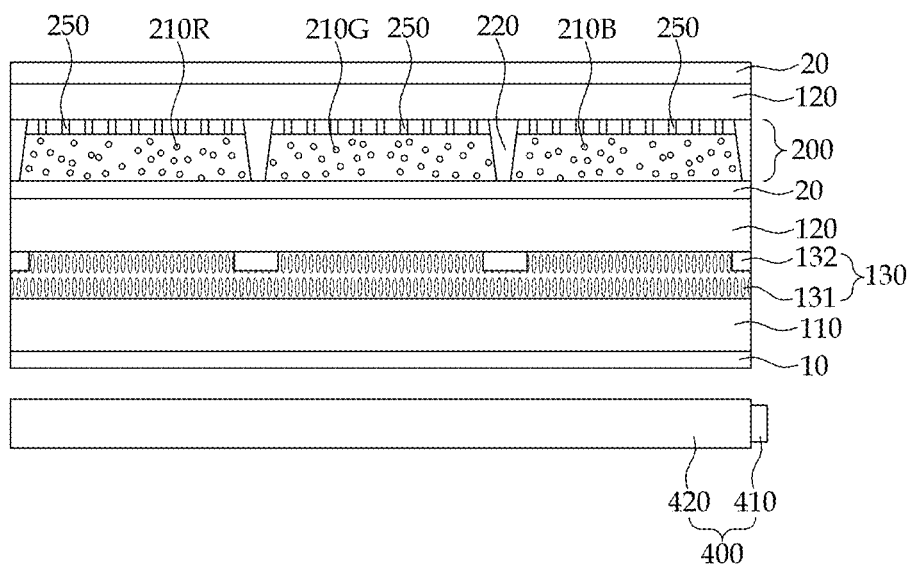
FIG. 9 is a cross-sectional view illustrating a display device according to a third embodiment of the present invention.
Figure 10:
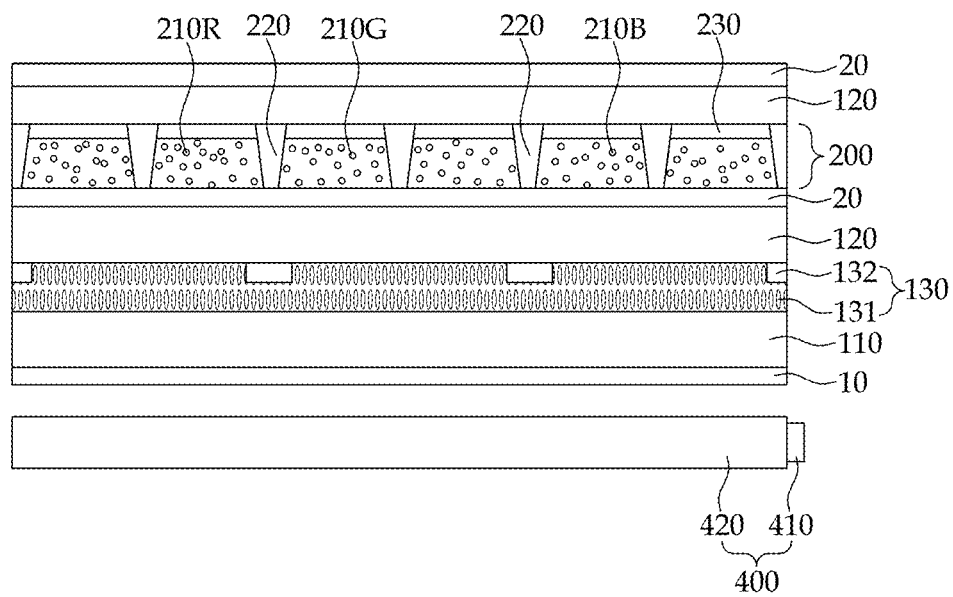
FIG. 10 is a cross-sectional view illustrating a display device according to a fourth embodiment of the present invention.
Figure 11:
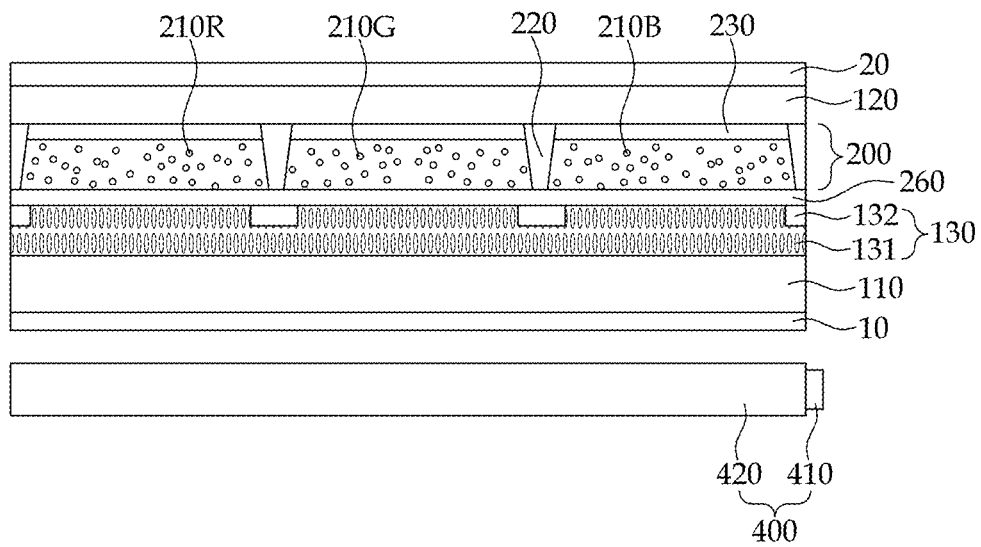
FIG. 11 is a cross-sectional view illustrating a display device according to a fifth embodiment of the present invention.

FIG. 8 is a cross-sectional view illustrating a display device according to the second embodiment of the present invention. FIG. 9 is a cross-sectional view illustrating a display device according to the third embodiment of the present invention. FIG. 10 is a cross-sectional view illustrating a display device according to the fourth embodiment of the present invention. FIG. 11 is a cross-sectional view illustrating a display device according to the fifth embodiment of the present invention.

Referring to FIG. 8, the display device according to the second embodiment of the present invention includes a low-refractive index layer 240 instead of the air layer. The air layer is a medium that has a low refractive index compared to the second substrate 120 or the phosphor, and thus the low-refractive index layer 240 that can bring about a similar effect as the air layer can be used.

The low-refractive index layer 240 includes aerogel. The aerogel has a refractive index in a range of 1.007 to 1.05. That is, the aerogel has a refractive index substantially similar to the air. Therefore, the low-refractive index layer 240 may produce an effect substantially the same as the air layer.

The aerogel has a structure where SiO2 nanostructures having a thickness of a ten thousandth of a human hair are extremely loosely tangled and air molecules may account for 90% or more of the whole volume in the nanostructure. The aerogel may be manufactured by the following processes: a wet-gel manufacturing process where a highly porous network structure is formed; and a drying process where liquid filling between the pores vaporizes into gas maintaining a nanoporous structure. In general, a sol-gel process is used as the wet-gel manufacturing process and a supercritical (or atmospheric pressure) drying process is used as the drying process. The aerogel may be manufactured as many different forms including inorganic materials, organic materials, organic-inorganic hybrids including Si-, Ti-, Zr-, Ce-, Sn-, and Al-based metal oxides, but silica-based aerogel is most widely used.

Referring to FIG. 9, the display device according to the third embodiment of the present invention includes a pattern 250 on the air layer. In a case where the pattern 250 is disposed on the air layer, light scattering may occur more actively inside the air layer. Therefore, the light extraction efficiency of the display device is improved.

Referring to FIG. 10, the display device according to the fourth embodiment of the present invention includes a sub-partition wall partitioning an area defined by the partition wall 220 into two or more areas. The sub-partition wall is disposed to have the same height as the existing partition wall 220. As a result, a structure further including the sub-partition wall corresponds to a structure where the number of the existing partition wall 220 is increased and gaps between the partition walls 220 are reduced. In a case where the sub-partition wall is provided, light reflection may occur more actively off the partition wall 220 and the light extraction efficiency can be improved.

Referring to FIG. 11, the display device according to the fifth embodiment of the present invention further includes a reflection filter 260 under the color conversion layer 200. The reflection filter 260 is configured to reflect light converted by the color conversion layer 200. That is, the reflection filter 260 rereflects light that is not radiated to the outside but propagates toward inside, thereby improving the light extraction efficiency.

The reflection filter 260 may include wire grids 22a. Herein, the wire grids 22a have a stripe pattern and may be made of conductive metal, such as aluminum (Al), molybdenum (Mo), tantalum (Ta), titanium (Ti), tungsten (W), chromium (Cr) and silver (Ag).

In this case, the wire grid 22a may have a width w, a height h, a period p of an adjacent wire grid 22a and be spaced a distance d apart from the adjacent wire grid 22a. Herein, the wire-grid period p can be obtained by adding the distance d and the width w of the wire grid 22a. This wire-grid period p is required to be smaller than wavelength of incident light and may be shorter than 200 nm. Further, the height h of the wire grid may be larger than 100 nm. The distance d, width w, height h, or period p of the wire grid 22a may be adjustable in accordance with required optical properties.

The reflection filter 260 rereflects part of visible light reversely propagating toward the backlight unit off to the color conversion layer 200. For example, in a case where the reflection filter 260 includes the plurality of wire grids 22a, the reflection filter 260 can reflect s-wave toward the color conversion layer 200. Therefore, the reflection filter 260 may play a role in displaying an image by leading the part of visible light reversely propagating from the color conversion layer 200 to the backlight unit to propagate toward the color conversion layer 200, thereby improving the light extraction efficiency.

Hereinafter, a sixth embodiment of the present invention will be described with reference to FIGS. 12 and 13.

Figure 12:
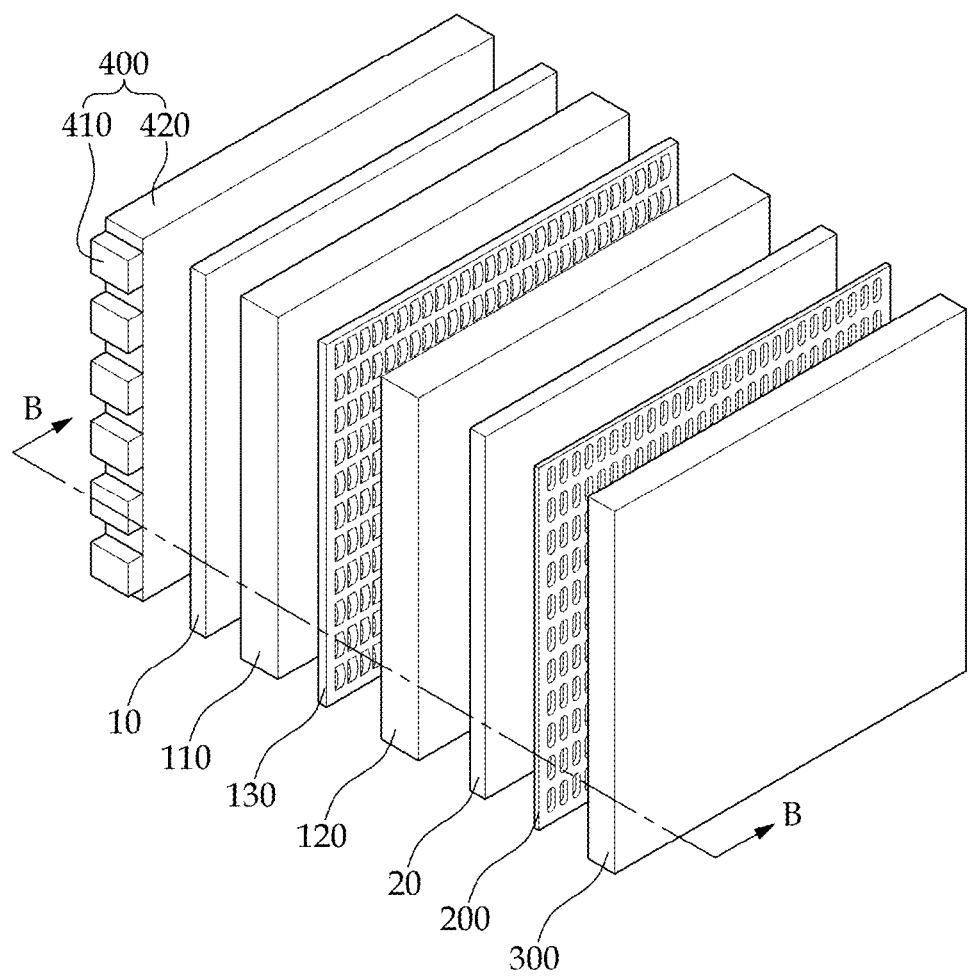
FIG. 12 is an exploded perspective view illustrating a display device according to a sixth embodiment of the present invention.

FIG. 12 is an exploded perspective view illustrating a display device according to the sixth embodiment of the present invention. FIG. 13 is a schematic cross-sectional view illustrating the display device of FIG. 12.

Figure 13:
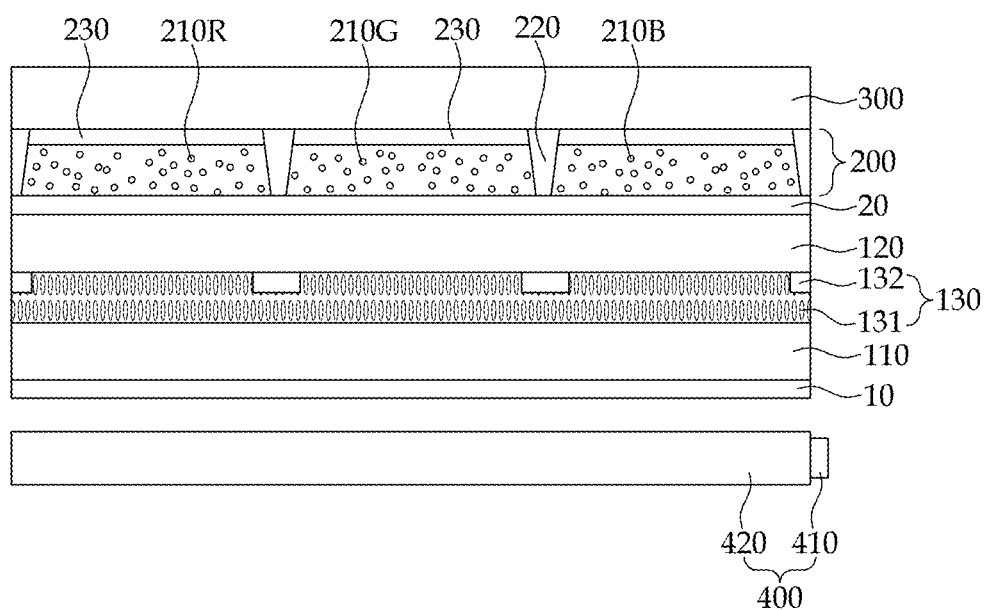
FIG. 13 is a schematic cross-sectional view illustrating the display device of FIG. 12.

Referring to FIGS. 12 and 13, the display device according to the sixth embodiment of the present invention further includes a third substrate 300 facing the second substrate 120.

The color conversion layer 200 includes the air layer 230 between the third substrate 300 and the phosphors 210R, 210G, and 210B. The color conversion layer 200 may be disposed on a bottom surface of the third substrate 300. Configurations and effects of the sixth embodiment are the same as the first embodiment except for the position of the color conversion layer 200, and thus the repeated description will not be provided.

From the foregoing, it will be appreciated that the aspects and features for a display device that may be constructed with a first substrate, a second substrate facing the first substrate, a light-amount adjusting layer interposed between the first substrate and the second substrate, and a backlight unit disposed under the first substrate. The second substrate may be constructed with a plurality of color conversions layers respectively disposed on a plurality of pixel regions; the color conversion layer may be a partition wall and a phosphor may be disposed on areas defined by the partition wall. The color conversion layer may be an air layer sited between the second substrate and the phosphor, and the color conversion layer disposed on a bottom surface of the second substrate. Various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings.

What is claimed is:

1. A display device comprising:
   a first substrate;
   a second substrate facing the first substrate;
   a plurality of color conversion layers disposed under the second substrate; and
   a light source disposed under the first substrate, the plurality of color conversion layers being interposed between the first substrate and the second substrate,
   wherein:
   the plurality of color conversion layers are respectively disposed on a plurality of pixel regions;
   the color conversion layer comprises:
      a plurality of partition walls;
      a phosphor disposed on areas defined by the partition walls; and
      an air layer located between adjacent ones of the partition walls and overlapping the pixel region, the pixel region configured to transmit a light of the light source;
   the phosphor is disposed between the air layer and the light source;
   each of the partition walls comprises a reflective surface facing the air layer; and
   a width of the air layer gradually decreases as the air layer is further away from the phosphor.

2. The display device of claim 1, wherein the color conversion layer is disposed on a bottom surface of the second substrate.

3. The display device of claim 1, wherein the reflective surface is configured to reflect light toward the air layer.

4. The display device of claim 1, wherein the color conversion layer further comprises a pattern disposed on the air layer.

5. The display device of claim 1, further comprising a reflection filter disposed under the color conversion layer.

6. The display device of claim 1, further comprising a sub-partition wall configured to partition the area defined by the partition walls into two or more areas.

7. The display device of claim 1, wherein the phosphor comprises a scattering particle.

8. The display device of claim 1, wherein the phosphor comprises at least one of a red phosphor, a green phosphor, and a blue phosphor.

9. The display device of claim 1, wherein the phosphor comprises a quantum dot particle.

10. The display device of claim 1, further comprising a polarizer disposed on the second substrate.

11. The display device of claim 1, further comprising a polarizer disposed on the first substrate.

12. The display device of claim 1, wherein a wettability of the phosphor is different from a wettability of the partition walls.

* * * * *